United States Patent [19]
Eisdorfer et al.

[11] Patent Number: 5,706,339
[45] Date of Patent: Jan. 6, 1998

[54] TECHNIQUE FOR USE IN PROCESSING PERSONAL TELEPHONE CALLS

[75] Inventors: Allen Eisdorfer, Woodbridge; Jerry Eisdorfer, Somerset, both of N.J.

[73] Assignee: AT&T, Middletown, N.J.

[21] Appl. No.: 346,654

[22] Filed: Nov. 30, 1994

[51] Int. Cl.$^6$ ..................................................... H04M 3/54
[52] U.S. Cl. .......................... 379/211; 379/207; 379/58; 379/213
[58] Field of Search ..................... 379/211, 213, 379/201, 210, 212, 207, 58

[56] References Cited

U.S. PATENT DOCUMENTS

| 5,206,901 | 4/1993 | Harlow et al. | 379/211 |
| 5,276,731 | 1/1994 | Arbel | 379/201 |
| 5,329,578 | 7/1994 | Brennan et al. | 379/201 |

OTHER PUBLICATIONS

"The Short Message Service", Reports of the Specialty Conference of the Information Technology Society, Sep. 27–29, 1993. pp. 517–526.

*Primary Examiner*—Ahmad F. Matar
*Attorney, Agent, or Firm*—Barry H. Freedman

[57] ABSTRACT

In a personal communication service (PCS) environment, where a call to a personal telephone number may be routed to a sequence of telephone numbers until the call is answered or abandoned, and where it is possible that the destination telephones indicated in the sequence may be disconnected telephones such that they are unreachable from any network, a method for avoiding wasteful attempts to route the call by a) determining if any telephone numbers of the sequence correspond to disconnected telephones, and, if so, b) skipping over such telephone numbers, i.e., those of disconnected telephones, so that no attempt is made to complete a PCS call to a disconnected telephone.

13 Claims, 3 Drawing Sheets

5,706,339

TECHNIQUE FOR USE IN PROCESSING PERSONAL TELEPHONE CALLS

TECHNICAL FIELD

This invention relates to personal communications, and more particularly, to the processing of a telephone call to a person's personal telephone number.

BACKGROUND OF THE INVENTION

Personal communication service (PCS) is a service in which subscribers, rather than locations or telephone stations, are assigned a personal telephone number. Calls placed to a subscriber's personal telephone number are routed to the subscriber at a telephone near that subscriber's current location. In order to provide a subscriber with such a personal communication service, e.g., as disclosed in U.S. Pat. No. 4,313,035, issued to Jordan, et al., the system providing the service (PCS system) must be supplied with the telephone number of a telephone near the subscriber's current location to which it should route calls placed to his personal telephone number. Each time the subscriber changes his location, the telephone number to which calls placed to his personal telephone number are routed must be changed. This requires the subscriber to call into the PCS system and to supply the telephone number to which his calls should currently be routed. Constantly having to call in to the PCS system can be tiresome, and supplying a ten-digit telephone number each time a subscriber changes his location is cumbersome.

One method for overcoming these drawbacks is to program a sequence of telephone numbers at any one of which the personal telephone service subscriber might be reached. The telephone numbers in a sequence are typically those of locations where a person is likely to be at various times throughout the day, such as "home", "car phone", "office", "pager", etc. When a call is made to the subscriber's personal telephone number, the PCS system attempts to complete the call by sequentially routing the call to each telephone number in the sequence. The PCS system continues such sequential routing of calls to each telephone number in the sequence until a) the call is answered, b) the call is abandoned, c) the line associated with one of the telephone numbers in the sequence is determined to be busy or d) until a predetermined period of time has elapsed.

It was recognized in U.S. patent application Ser. No. 08/144,062, (now U.S. Pat. No. 5,392,342), assigned to the same assignee as the present invention, that it is possible that the telephone from which a caller originates a call is specified as one of the sequence of destinations to which the PCS system will attempt to route a particular PCS call. This situation might occur when a wife, calling from home, dials her husband's personal telephone number, which is programmed to attempt to reach him first at his office, then at home on the same telephone line on which his wife is calling, and finally, at his mobile telephone in his car. It was also recognized in the aforementioned patent application that, in a PCS environment, it is beneficial to avoid routing the PCS call back to the telephone number from which the call was originated, as such a circular call attempt cannot be completed. This may be achieved by a) determining if the originating station identification information, e.g., the telephone number, of the calling telephone from which the PCS call is originated, is the same as a destination, e.g., telephone number, in the sequence of destinations to which the PCS call is to be routed to, and, if so; b) skipping over that destination, e.g., the caller's telephone number, so that no attempt is made to complete a PCS call to the calling telephone. The originating station identification information may be obtained by using automatic numbering identification (ANI).

SUMMARY OF THE INVENTION

We have recognized that there is another, unrelated, category of telephones which may be designated in the sequence of telephone numbers for a PCS call but to which it is beneficial to avoid routing the PCS call as the call attempt, although not circular, cannot be completed. Doing so avoids a) the unnecessary waste of system resources, e.g., processing time, that would otherwise result and b) the unnecessary expense to the carrier of the PCS call which may result if an access charge would have been incurred for the avoided call attempt. In particular, we have recognized that PCS calls should not be attempted to so-called "disconnected telephones", i.e., telephones that are 1) unreachable by the telephone system for any communication, e.g., they have been turned off in a manner that disconnects them from any communications link to the telephone system, and 2) the telephone system can detect that the telephone has become unreachable. Exemplary disconnected telephones include a) wireless telephones that have been turned off, i.e., they are not in a low-power standby mode, and b) a video telephone that is connected to a cable network but has been turned off. In an exemplary embodiment of the invention, PCS calls are not routed to disconnected telephones by a) determining if the current destination telephone in the sequence is a disconnected telephone, and, if so, b) skipping over that destination, so that no attempt is made to complete a PCS call to the "disconnected telephone".

DETAILED DESCRIPTION

Figure 2:
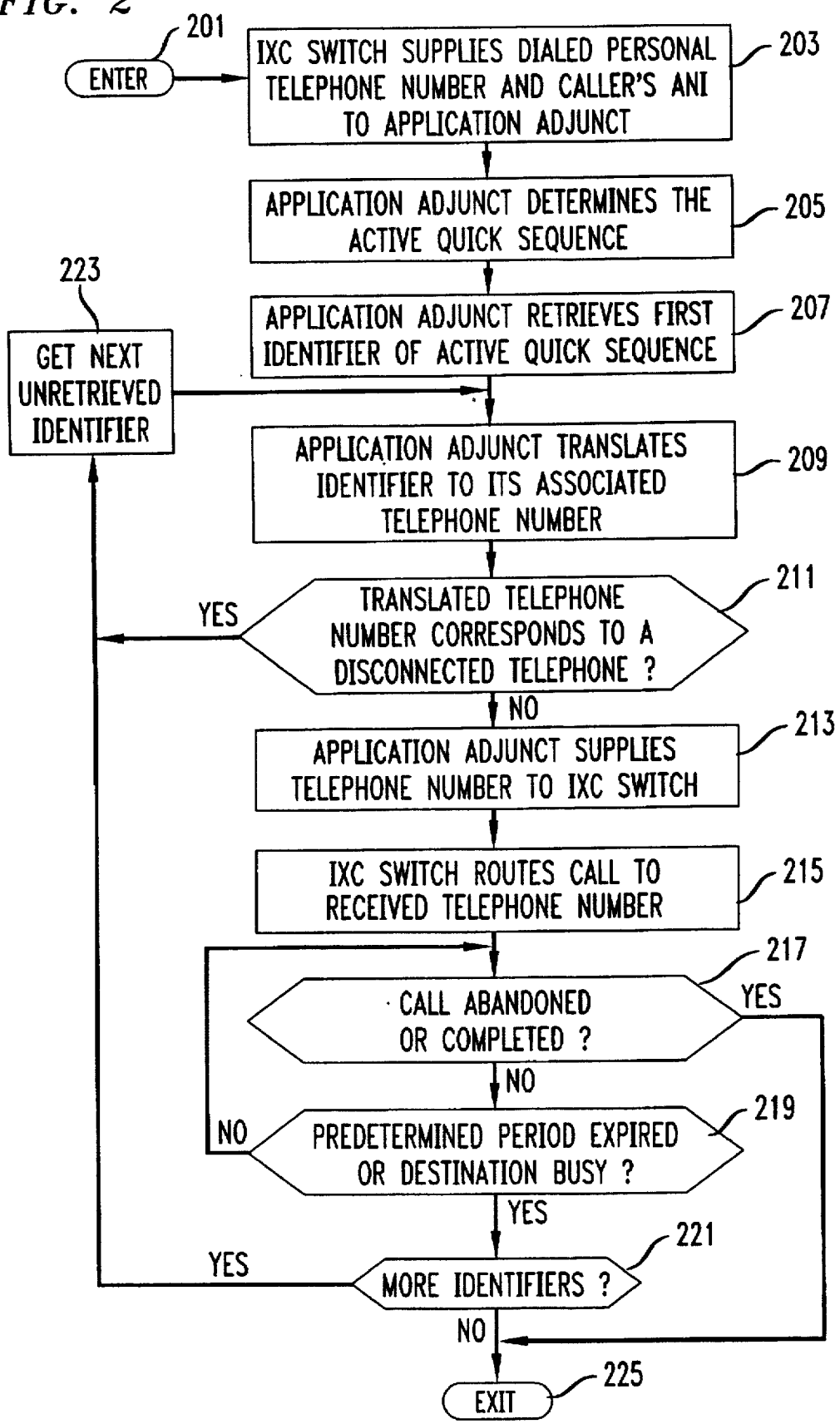
FIG. 2 shows a flowchart of an exemplary process for providing personal telecommunication services in accordance with the principles of the invention.

FIG. 2 shows a flowchart of an exemplary method for processing PCS calls in accordance with the principles of the invention. In particular, the PCS system a) determines if the current destination telephone in the sequence is a "disconnected telephone" and, if so, b) it skips over that telephone number, i.e., of the disconnected telephone. Thus, advantageously, the PCS system does not attempt to complete the PCS call to a disconnected telephone. It is noted that "disconnected telephones", are telephones that are 1) unreachable for any communication by any network of the telephone system, e.g., they have been turned off in a manner that disconnects them from any communications link to the telephone system, and 2) the telephone system can detect that the telephone has become unreachable. Typically such disconnected telephones are directly addressable, i.e., communication with such a telephone is not dependent upon the telephone having a particular connection, e.g., being connected to a particular telephone line—as with conventional wired telephones—, but instead communication depends upon a unique address contained within the telephone itself, so that the telephone can be freely moved without changing its address.

Disconnected telephones are typically only temporarily unreachable for any communication by the telephone system. Conventional exemplary disconnected telephones include wireless telephones that have been turned off, i.e., they are not in a low-power standby mode. Thus, for example, a car telephone may become disconnected when a driver reaches his destination and turns off the car. Similarly, a portable wireless telephone that is being carried by a person may become disconnected when the batteries of the portable wireless telephone weaken so that they are unable to power it any longer. Another exemplary type of disconnected telephone is a video telephone that is connected to a cable network but has been turned off.

In order to understand FIG. 2, it is first necessary to understand the operation of a PCS system. Therefore, attention is first directed to FIG. 1, which shows an exemplary embodiment of a PCS system in accordance with the principles of the invention. The exemplary PCS system includes a) telephone station 101, from which calls to a personal telephone number may be originated or received, b) telephone line 102 of telephone station 101, which is provisioned, for purposes of illustrating the principles of operation of a PCS system with the well known call waiting feature, c) local exchange carrier (LEC) 103, d) IXC switch 105, e) application adjunct 131, f) attendant position 125, and g) communication interfaces 151, including communications interfaces 151-1 through 151-N.

Application adjunct 131 performs the necessary processing for 1) storing an association between a) a telephone number, b) a pre-defined, mnemonic tag, and c) a corresponding identifier; 2) developing and storing sequences of telephone numbers for PCS calls, which are referred to herein as "quick sequences"; and 3) supplying the telephone numbers of destinations to which IXC switch 105 should route a call placed to a subscriber's personal telephone number, in accordance with the principles of the invention. Application adjunct 131 includes: a) application processor 135, b) data base 133, c) voice response unit 123, and d) communication interfaces 137. Application processor 135 controls the overall operation of application adjunct 131 by performing any necessary processing and exchanging messages with the other components of application adjunct 131 over links 139. Links 139 convey information in digital form and need not all be of the same type or speed, e.g., one may be an ethernet link while the others are RS-232C links. Data base 133 stores the information required by application processor 135 to control application adjunct 131, e.g., program code and data.

Voice response unit 123 can make various announcements which can be heard by the calling party. The information necessary for making the announcements, or combinative portions thereof, may be prestored in voice response unit 123. Such combinative portions may include caller instruction messages, e.g., "Please wait, we are attempting to reach your party." In one embodiment, the announcements are accessed by supplying voice response unit 123 with pointers to them. Voice response unit 123 is connected to switch fabric 118 so that the announcements may be routed to subscribers connected to application adjunct 131.

Communication interfaces 137 translate information for communication between application adjunct 131 and devices external to application adjunct 131. Communication interfaces 137 need not be the same. Attendant position 125, staffed by a human attendant, interfaces with application adjunct 131 to handle any questions that a subscriber may have or any problems that may arise.

Communication interfaces 151 translate information for communication between application adjunct 131 and communications systems external to application adjunct 131, which may be belong to separate communications carriers. Communication interfaces 151 need not be the same.

IXC switch 105 includes: a) main processor 107, b) dual tone multi-frequency receiver (DTMF REC) 111, c) directory services network interface 115, d) bus 117, e) switch fabric 118, and f) optional voice recognition unit 116. Main processor 107 controls the overall operation of IXC switch 105 by performing any necessary processing and exchanging messages with the other components of IXC switch 105 over bus 117. Dual tone multi-frequency receiver (DTMF REC) 111 receives dual tone multi-frequency signals that are transmitted in response to the pressing of keys on the keypad of telephone station 101 and supplies the digit corresponding to each pressed key to main processor 107. IXC switch 105 receives the caller's ANI from LEC 103 in the conventional manner.

Directory services network interface 115 is a protocol conversion unit that permits IXC switch 105 to communicate with application adjunct 131. It is responsible for formatting all messages transmitted to and for extracting responses received from application adjunct 131. Such messages include a) a message from IXC switch 105 indicating the ANI of the calling telephone and b) a message from application adjunct 131 indicating which destination telephone number the PCS call should presently be routed to. In one embodiment, the link between directory services network interface 115 and application adjunct 131 uses the well known X.25 protocol.

Switch fabric 118 can connect the trunk on which the subscriber's call arrived at IXC switch 105, e.g., trunk 104, to a) dual tone multi-frequency receiver (DTMF REC) 111, b) voice recognition unit 116, c) voice response unit 123, other communication systems terminated thereat, e.g., wireless communication system 159, or e) to the rest of the interexchange carrier's network, via link 121. Some of the purposes of such connections are described further below.

Figure 1:
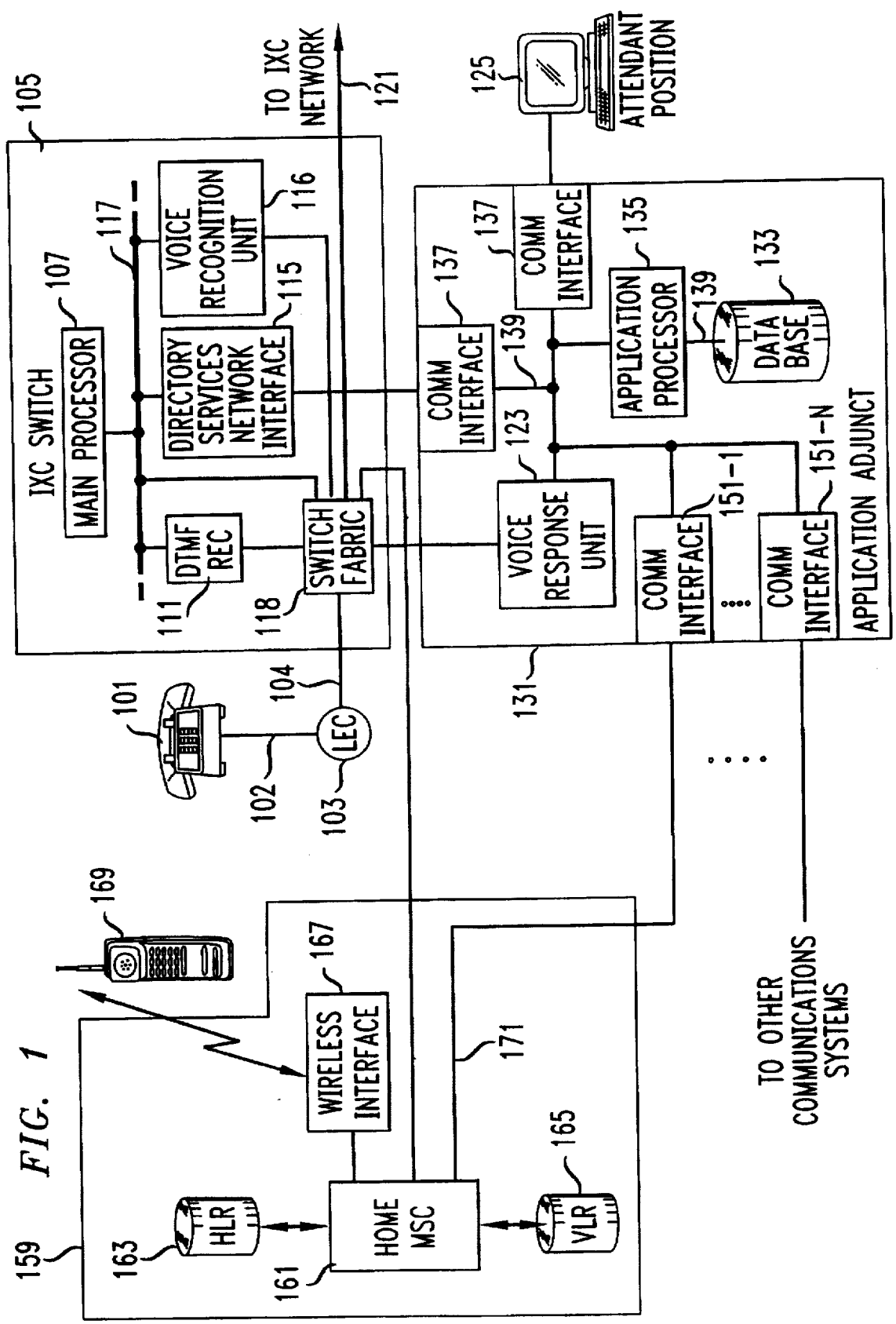
FIG. 1 shows an exemplary embodiment of a system for providing personal communications services in accordance with the principles of the invention.

Also shown in FIG. 1 is exemplary wireless communication system 159 of a mobile carrier. Exemplary wireless communication system 159 includes a) home mobile switching center (MSC) 161, b) home location register (HLR) data base 163, c) visitor location register (VLR) data base 165, and d) wireless interface 167. Mobile telephone 169 is shown as being presently connectable to wireless communication system 159. Home mobile switching center (MSC) 161 is a switch for providing wireless telephone service to the subscribers of the mobile carrier that owns home mobile switching center (MSC) 161 as well as subscribers of other mobile carriers that are visiting, also known as "roaming" in, the area served by home mobile switching center (MSC) 161. Home mobile switching center (MSC) 161 is connected to switch fabric 118 so that calls may be routed from IXC switch 105 to wireless subscribers. For the purpose of keeping track of the active subscribers presently being served by mobile switching center (MSC) 161, home mobile switching center (MSC) 161 is connected to 1) home location register (HLR) data base 163, 2) visitor location register (VLR) data base 165, and 3) wireless interface 167.

Home location register (HLR) data base 163 contains a list of the subscribers of the mobile carrier that owns home mobile switching center (MSC) 161 and have home mobile switching center (MSC) 161 as their "home" mobile switch, i.e., the list of subscribers that are not roaming when they are served by home mobile switching center (MSC) 161. Such subscribers are called "home subscribers". Home location register (HLR) data base 163 is used for routing of calls by keeping track of the current location of, e.g., the mobile switching system presently or last known to have been serving, each "home subscriber". To this end, for example, home location register (HLR) data base 163 maintains a pointer to the current location of each home subscriber. The pointer contains a system address of the mobile switching center (MSC) that is presently, or was last known to have been, serving that home subscriber.

Visitor location register (VLR) data base 165 contains a list of each subscriber presently being or was last known to have been served by home mobile switching center (MSC) 161, whether they are a home subscriber or a roaming subscriber. Visitor location register (VLR) data base 165 also contains status information indicating whether each subscribers presently being served by home mobile switching center (MSC) 161 is connected or disconnected. Thus, it is noted, that subscribers are always considered to be a "visitor", even when they are served by their home mobile switching center (MSC).

Wireless interface 167 provides the wireless connection, e.g., cellular radio connection, between home mobile switching center (MSC) 161 and a wireless personal communication device, e.g., wireless telephone 169.

In one embodiment of the invention, for ease of use and administration, each telephone number to which PCS calls can be routed is stored in association with a pre-defined, mnemonic tag and a corresponding identifier. Table 1 shows an exemplary list of such tags and their corresponding identifiers. In this embodiment, Table 1 is stored in data base 133. Table 1 may be implemented as an array in which the tags are the elements of the array and the identifiers are the corresponding indices into the array. Text-to-speech conversion may be used to speak the tags or, alternatively, there may also be stored pointers to information representing stored speech for each tag. The information representing speech may be stored in voice response unit 123, as noted.

TABLE 1

| Tag | Identifier |
| --- | --- |
| Home Voice Telephone | 01 |
| Office | 02 |
| Secretary | 03 |
| Wireless Phone | 04 |
| Wife | 05 |
| Husband | 06 |
| AT&T Voice Mail | 07 |
| AT&T Voice Mail with Pager | 08 |
| AT&T Pager | 09 |
| Spouse | 10 |
| Roommate | 11 |
| Children | 12 |
| Neighbor | 13 |
| Mother | 14 |
| Father | 15 |
| Parents | 16 |
| Home Cable Videophone | 17 |

Table 2 shows an exemplary table in which identifiers are associated with telephone numbers for a particular PCS subscriber having a unique personal telephone number. In one exemplary embodiment, the telephone numbers are stored in data base 133 as elements of an array, one array for each subscriber, and the identifiers are the corresponding indices into the array. The array may be stored in a compressed form. Also stored in Table 2 is the status of the telephone corresponding to the telephone number, e.g., is the telephone connected or disconnected.

TABLE 2

| Identifier | Telephone # | Status |
| --- | --- | --- |
| 01 | 5559742211 | Connected |
| 02 | 5559497777 | Connected |
| 03 | 5559492211 | Connected |
| 04 | 5554152219 | Disconnected |
| 05 | | |
| 06 | | |
| 07 | 8005558100 | Connected |
| 08 | 8005554444 | Connected |
| 09 | 8005552312 | Connected |
| 10 | | |
| 11 | | |
| 12 | 2213861599 | Connected |
| 13 | | |
| 14 | 8334429181 | Connected |
| 15 | | |
| 16 | | |
| 17 | 5009998828 | Connected |

The stored associations between tags and telephone numbers are used to create a sequence of locations to which the calls to a subscriber's personal telephone number should be routed. Again, such a sequence of destinations is known as "quick sequence". Each of a subscriber's quick sequences has a quick sequence number which is a unique numerical designation.

Table 3 shows an exemplary set of quick sequences, QS1 to QS9, each having at most 3 possible telephone numbers to which they can attempt to route a call. Each telephone number is represented by the identifier (ID) corresponding to a tag which has been associated with that telephone number. Of course, in other embodiments of the invention, other quick sequences can have more than at most 3 possible telephone numbers. Also, as shown in table 3, each quick sequence need not have the same number of telephone numbers indicated therein.

TABLE 3

| Quick Sequence Routings | | | |
| --- | --- | --- | --- |
| Routing | ID 1 | ID 2 | ID 3 |
| QS1 | 02 | 01 | 04 |
| QS2 | 01 | | |
| QS3 | 01 | 02 | 03 |
| QS4 | 14 | 04 | 12 |
| QS5 | 04 | 17 | 01 |
| QS6 | 02 | 03 | |
| QS7 | | | |
| QS8 | 04 | 02 | |
| QS9 | | | |

Although not critical, understanding of the invention will be helped by first considering an example of the administration of a quick sequence. The example, which is divided into two separate listings, listing 1 and listing 2, shows how the tags are used to define a sequence of locations to which calls to a subscriber's personal telephone number should be routed at a particular time. Each of the listings shows an exemplary part of the interactions between a hypothetical subscriber and an automated attendant system that facilitates the administration of personal telephone numbers. Listing 1 shows the defining of a quick sequence. Listing 2 shows the designating of the quick sequence defined in listing 1 as the sequence that is to currently be used, thereby "activating" the quick sequence.

The listings show that portion of the interaction after a) the hypothetical subscriber places a call to an 800-type telephone number to connect to application adjunct 131, b) he has successfully completed any required login procedures parenthesis. Also, in this example, the identifier corresponding to each tag is a one digit number.

---

Listing 1 - Storing tags in a quick sequence

---

To manage your call screening PINs, press 1.
To manage your tags, press 2.
To manage your quick sequences, press 3.
subscriber presses 3.
To add a quick sequence, press 1.
To delete a quick sequence, press 2.
To hear your quick sequences, press 3.
subscriber presses 1.
Enter the quick sequence number. Please enter a number from one to nine.
subscriber presses 1. (the quick sequence will be stored as quick sequence number 1).
Where is the first place calls should be delivered.
(the following listed items are those tags that have a phone number associated with them.
Tags
without a phone number are not listed).
Home Voice Telephone, press 1.
Office, press 2.
Wireless Phone, press 4.
Neighbor, press 13.
Mother, press 14.
Home Cable Video Telephone, press 17
Brother, press 20.
Summer Home Voice Telephone, press 33.
subscriber presses 4. (Wireless Phone becomes the first destination in the quick sequence)
You have selected wireless phone as the first place calls should be delivered.
Where is the second place calls should be delivered.
Press # to end this sequence.
Home Voice Telephone, press 1.
Office, press 2.
Wireless Phone, press 4.
Neighbor, press 13.
Mother, press 14.
Home Cable Video Telephone, press 17
Brother, press 20.
Summer Home Voice Telephone, press 33.
subscriber presses 2. (Office becomes the second destination in the quick sequence)
You have selected office as the second place calls should be delivered.
Where is the third place calls should be delivered.
Press # to end this sequence.
subscriber presses #. (Ends the quick sequence)
Quick sequence 1 is wireless phone and then office.
To approve this quick sequence press 1.
To approve this quick sequence and add another press 2.
To redo this quick sequence press 3.
To quit what you are doing and return to the main menu press *R.
subscriber presses 1. (returns to the main menu)

---

Listing 2 - Activating a quick sequence

---

To get voice mail, press 1
To turn a quick sequence or quick follow me destination on or off, press 2.
To change your call delivery schedules, press 3.
To administer your lists and system settings, press 4.
To hear where your calls are going, press 5.
To get help, press *H.
subscriber presses 2.
Enter the quick sequence number or enter 0 to hear your list of quick sequences. To use quick follow me press #.
subscriber presses 1.
Starting immediately your calls will be delivered to wireless phone and then
to office. This quick sequence will stay in effect until you turn it
off.
To accept this quick sequence, press 1. Otherwise press 0.
subscriber presses 1.
Thank you.

--- to begin administering his personal telephone number, and c) the tags, telephone numbers and identifiers have been associated together. In each of the listings, boldface type shows that which the automated attendant says to the hypothetical subscriber. The actions taken by the caller are described in plain type. Explanatory comments as to the results caused by the subscriber's actions are shown in Returning attention to FIG. 2, shown is a flowchart of an exemplary process for providing personal telecommunication services in accordance with the principles of the invention. The process is entered in step 201 when IXC switch 105 recognizes that the call is being placed to a personal telephone number. This is possible because personal telephone numbers have certain unique characteristics that allow them to be differentiated from conventional telephone numbers. For example, they may have a unique area code, and, within that area code, they may be further divided by unique exchange numbers that indicate the interexchange carrier (IXC) that will carry calls directed to the number. Prior to step 201, but part of the overall process of completing a PCS call, when a call is placed to a personal telephone number, e.g., by a calling party originating a call at a telephone station 101 (FIG. 1), a switch of local exchange carrier (LEC) 103 receives the dialed digits and, from their unique characteristics, recognizes that the call is an IXC personal communications type of call. Local exchange carrier (LEC) 103 then routes the call over a trunk, e.g., trunk 104, to switch 105 of an interexchange carrier for further handling as per the process shown in FIG. 2.

In step 203, IXC switch 105 queries application adjunct 131, via directory services network interface 115 and communications interface 137, as to where to route the call. The query includes an indication of the personal telephone number to which the call was placed. Application adjunct 131 determines the currently active quick sequence, according to which calls to the personal telephone number should presently be routed, in step 205. Control then passes to step 207, in which application adjunct 131 retrieves the first identifier of the currently active quick sequence. Next, in step 209, application adjunct 131 translates the identifier to its associated telephone number.

Thereafter, in accordance with the principles of the invention, conditional branch point 211 tests to determine if the translated telephone number is that of a disconnected telephone, e.g., the status of the telephone in table is "Disconnected". This test may be performed by checking the status column of Table 2. If the test result in step 211 is NO, indicating that the value stored for the telephone number in the status column of Table 2 is "Connected", control passes to step 213, in which application adjunct 131 supplies the telephone number to IXC switch 105. IXC switch 105 routes the call to the telephone number it receives from application adjunct 131, in step 215. This results in the caller hearing the appropriate feedback tones, e.g., ringing or busy, depending on the status of the telephone line to which the call is routed and whether or not that telephone line is provisioned with the call waiting feature.

Next, conditional branch point 217 tests to determine if the call, as routed by IXC switch 105, has been a) completed or b) abandoned by the caller. If the test result in step 217 is YES, the process is exited in step 225. If the test result in step 217 is NO, indicating the call continues to exist, control passes to step 219, which tests to determine if a) the destination indicated by the supplied telephone number is busy or b) if the predetermined period for which the call should be routed to the supplied telephone number has expired. If the test result in step 219 is NO, control passes back to step 217. If the test result in step 219 is YES, control passes to conditional branch point 221, which tests to determine if there remains in the quick sequence any identifiers that have not yet been processed.

If the test result in step 221 is NO, indicating there are no remaining untried identifiers, control passes to step 225 and the process is exited. If the test result in step 221 is YES, control passes to step 223, in which application adjunct 131 retrieves the next untried identifier. Control then passes back to step 209 and the process continues as described above.

In accordance with the principles of the invention, if the test result in step 211 is YES, indicating that the value stored for the telephone number in the status column of Table 2 is "Disconnected", and thus the translated telephone number, i.e., the telephone number to which the call will be routed next, is that of a disconnected telephone, control passes directly to step 223 to obtain the next untried identifier. Thus, advantageously, not time or expense is wasted attempting to complete the PCS call to a disconnected telephone.

There are three exemplary processes by which it may be determined by application adjunct 131 if a telephone number corresponds to a disconnected telephone.

In the first method, each time the status of a wireless telephone changes, home mobile switching center (MSC) 161 transmits a message via link 171 to communications interface 151-1 indicating the wireless telephone's telephone number and its new status. Application adjunct 131 can then update the information stored in the status column of table 2 for that telephone number.

Figure 3:
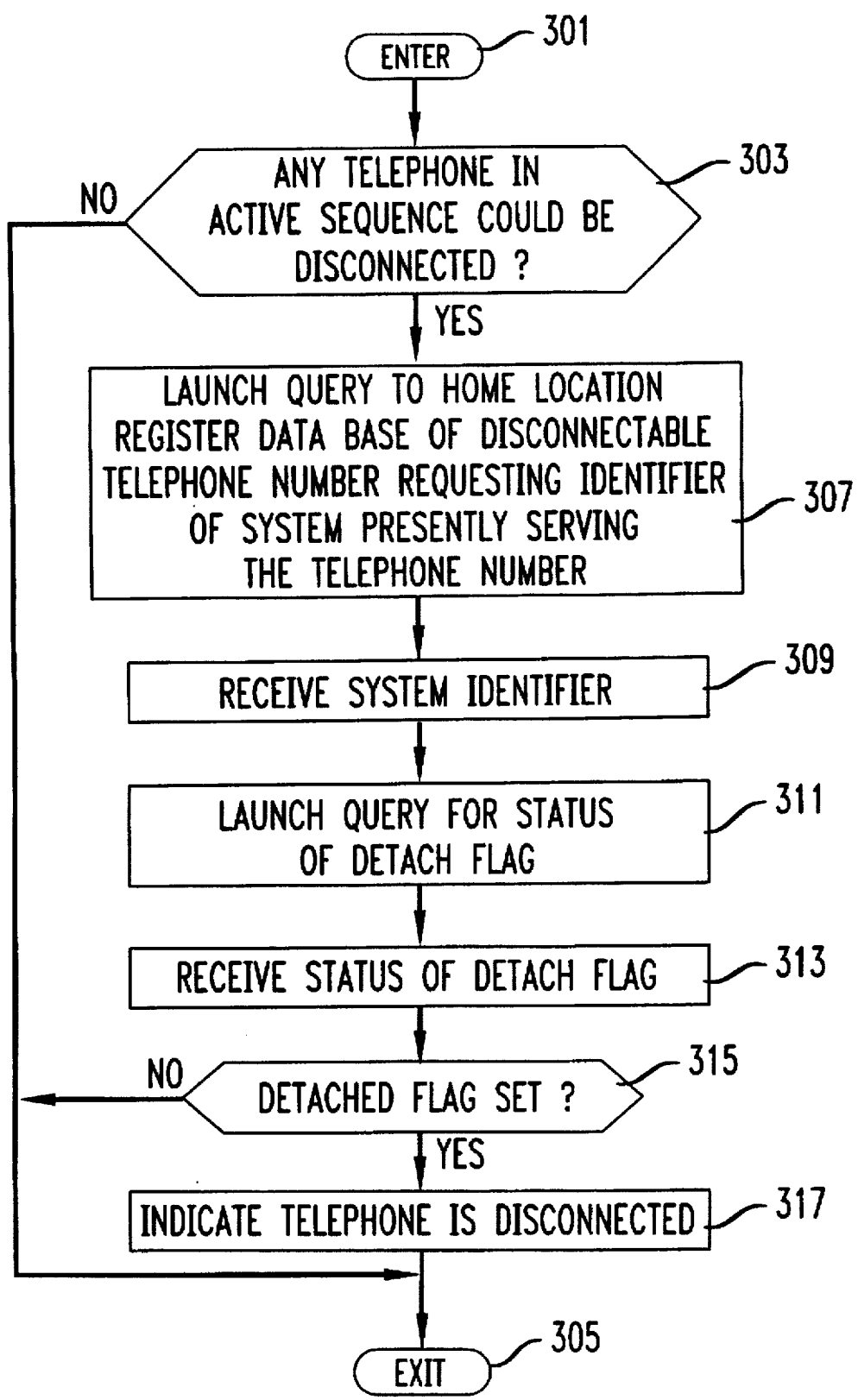
FIG. 3 shows a method for determining if a telephone number corresponds to a disconnected telephone.

A second method by which application adjunct 131 determines if a telephone number corresponds to a disconnected telephone is shown in FIG. 3. The process shown in FIG. 3 is suitable for use with wireless telephones. The process shown in FIG. 3 is entered in step 301, which is executed after step 205 of the process shown in FIG. 2. Conditional branch point 303 tests to determine if any of the telephone numbers listed in the active quick sequence is that of a telephone that may be disconnected. It is known in advance that certain of the identifiers that are stored in the quick sequences correspond to telephone numbers of wireless telephones that may be disconnected. For example, identifier 04 corresponds to Wireless Phone and wireless telephones may be disconnected. If the test result in step 303 is NO, indicating that there are no wireless telephones in the quick sequence, control passes to step 305 and the process is exited. If the test result in step 303, is YES control passes to step 307, in which, based on the telephone number associated with the identifier stored in the quick sequence, application adjunct 131 launches a query over the appropriate one of communication interfaces 151 to the home location register data base of the home mobile switching center of the wireless telephone requesting the identifier of the mobile switching center that presently is serving, or was last known to be serving, the wireless telephone, and therefore contains its visitor location record. In step 309, application adjunct 131 receives the requested identifier from the mobile switching center.

Next, in step 311, application adjunct 131 launches a query to the visitor location register data base of the identified mobile switching center requesting the status of the "detach" flag for the telephone number. The detach flag is a conventionally available flag that indicates when set that the wireless telephone is disconnected and when clear that the wireless telephone is connected and available for calls. The detach flag is maintained in the visitor location register data base of the mobile switching center that is presently providing service to the wireless telephone or was the last mobile switching center to have provided service prior to the wireless telephone becoming disconnected. In step 313, a response is received at application adjunct 131.

Conditional branch point 315 tests to determine if the detach flag is set. If the test result in step 315 is NO, indicating that the detached flag is clear and that the wireless telephone is connected and available for calls, control passes to step 305 and the process is exited. If the test result in step 315 is YES, indicating that the detached flag is set and that the wireless telephone is disconnected, control passes to step 317 in which, in accordance with an aspect of the invention, a "Disconnected" entry is made in the status column of Table 2 for the wireless telephone, thus indicating that the wireless telephone is a disconnected telephone that is to be skipped over at step 211 during the processing the quick sequence. The process then exits in step 305.

A third method by which application adjunct 131 determines if a telephone number corresponds to a disconnected telephone is the use of periodic polling. Such periodic polling is suitable for wireless telephones as well as for cable system based videophones. To employ polling, it is known in advance that certain of the identifiers that are stored in the quick sequences correspond to telephones that may be disconnected, e.g., identifier 04, which corresponds to Wireless Phone and identifier 17, which corresponds to Home Cable Videophone. According to the periodic polling method, application adjunct 131 periodically launches a query for each telephone number that is associated with an identifier which corresponds to a telephone that may be disconnected from the communication system to which the telephone is presently, or was last, connected, requesting the status of the telephone. How such status information is communicated for wireless telephones was described above in conjunction with FIG. 3. The status information in Table 2 is updated in accordance with the response to the query.

For cable based communication systems, similar queries are launched to the cable system serving the specified telephone number. Those skilled in the art of cable communication will be able to implement systems for determining the status of telephones connected to the cable system. It is noted that to improve the efficiency of the polling, queries need only be launched for telephone numbers of the presently active quick sequence. Moreover, when a new quick sequence is activated by a subscriber, those telephone numbers of the quick sequence that correspond to wireless telephones that may be disconnected are given priority in the polling process so that they are polled immediately, before resuming the usual polling pattern.

In another embodiment of the invention, all the telephone numbers of the quick sequence are examined prior to any of them being supplied to IXC switch 105. If any of the telephone numbers are found to correspond to a disconnected telephone, such a telephone number is temporarily blanked in the quick sequence. Such blanking may be achieved by setting a special blanking field associated with the telephone number.

It is noted that calls may also be routed from IXC switch 105 to home mobile switching center (MSC) 161 indirectly via the rest of IXC network. It is also noted that a LEC may be interposed between the IXC and the MSC.

In other embodiments of the invention, telephone numbers and/or ANI may be replaced with other indications that represent the destination to which a call is to be routed. Also, in other embodiments of the invention, the information indicating the status of a telephone as being disconnected or not may be stored in the same data base as the information for implementing the quick sequences.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. A method for use in a telephone system having a plurality of destinations to which a personal communication system (PCS) call may be routed, said telephone system attempting to complete a PCS call placed from a calling telephone to a subscriber's personal telephone number by routing said call, until said call is answered or abandoned, to each destination indicated in a predetermined sequence of destinations, the method comprising the steps of:

determining if a current destination in said sequence is a disconnected telephone; and attempting to route the call to said current destination to complete said PCS call only if a result from said step of determining indicates that said current destination is not a disconnected telephone, so that no attempt is made to route a PCS call to the disconnected telephone.

2. The invention as defined in claim 1 wherein said destinations are indicated by telephone numbers.

3. The invention as defined in claim 1 wherein said disconnected telephone is a wireless telephone that has been turned off.

4. The invention as defined in claim 1 wherein said disconnected telephone is a telephone that has been disconnected from a cable network.

5. The invention as defined in claim 1 wherein said steps are performed in a telephone network within said telephone system that is not directly connectable to said disconnected telephone.

6. The invention as defined in claim 1 wherein said steps are performed in an interexchange carrier within said telephone system.

7. The invention as defined in claim 1 wherein at least one of said plurality of destinations is presently served by at least one other telephone system to which said telephone system is connected, and wherein said method includes the step of receiving a signal from said at least one other telephone system indicating whether or not said at least one of said plurality of destinations served by said at least one other telephone system is a disconnected telephone.

8. The invention as defined in claim 7 further including the step of storing an indication that said at least one of said plurality of destinations served by at least one other telephone system is a disconnected telephone, said storing being performed in response to said received signal.

9. The invention as defined in claim 7 further including the step of transmitting from said telephone system to said at least one other telephone system a request for information indicating whether or not said at least one of said plurality of destinations served by said at least one other telephone system is a disconnected telephone and wherein said signal is received in response to said transmitted request.

10. The invention as defined in 9 wherein said requests are transmitted periodically.

11. The invention as defined in 9 further including the step of transmitting a query from said telephone system to a home telephone system for said at least one of said plurality of destinations requesting information identifying said at least one other telephone system, said home telephone system being connected to said telephone system.

12. The invention as defined in claim 11 wherein said home telephone system is said at least one other telephone system.

13. A method comprising the steps of:

receiving a plurality of destinations to which a personal communications system (PCS) call may be routed by a telephone system;

determining for at least one destination in said received plurality of destinations whether said at least one destination is a disconnected telephone;

generating a sequence of routing destinations wherein said sequence does not include those destinations in said plurality of destinations that are determined to be disconnected telephones; and attempting to route, using said telephone system, a PCS call placed from a calling telephone, only to routing destinations contained in said generated sequence so that no attempt is made to route said PCS call to a disconnected telephone.

\* \* \* \* \*